UNITED STATES PATENT OFFICE.

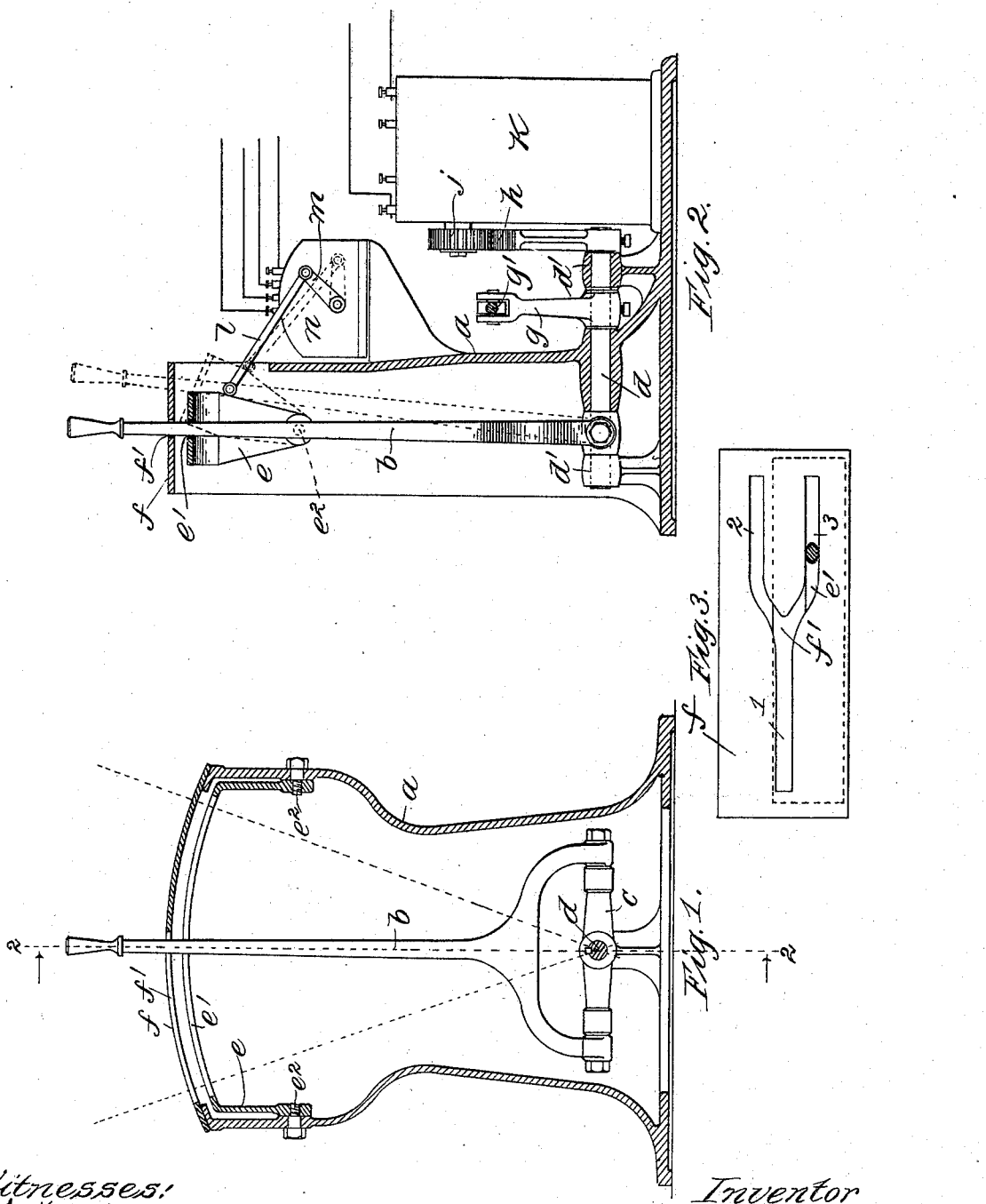

KARL ARNOLD BERNHARD DANIEL KÖTTGEN, OF CHARLOTTENBURG, GERMANY, ASSIGNOR TO THE SIEMENS & HALSKE ELECTRIC COMPANY OF AMERICA, OF CHICAGO, ILLINOIS.

CONTROLLING DEVICE.

SPECIFICATION forming part of Letters Patent No. 610,064, dated August 30, 1898.

Application filed December 30, 1897. Serial No. 664,576. (No model.)

*To all whom it may concern:*

Be it known that I, KARL ARNOLD BERNHARD DANIEL KÖTTGEN, a subject of the Emperor of Germany, residing at Charlottenburg, Germany, have invented new and useful Improvements in Controlling Devices, (Case No. 112,) of which the following is a specification, reference being had to the accompanying drawings, forming a part thereof.

My invention relates to a controlling device particularly adapted for governing electrically-actuated appliances, and has for its object the provision of positive, simple, and efficient means for accomplishing with a single actuating part or lever a plurality of controlling movements in such device. When, for instance, an electrically-actuated hoisting appliance is to be controlled, a reversing-switch, a braking device, and a starting-box may be required by the attendant to secure the complete control thereof. This multiplication of separate apparatus is not only undesirable, but, requiring in addition individual manual adjustments, the operation thereof becomes correspondingly complex. In the device of the present application embodying the improvements of my invention I have insured the operation of the several controlling appliances by means of a single actuating lever or part.

The controlling device may be briefly described as consisting of an operating-lever connected with the several controlling appliances and adapted by its composite movement to effect the separate though interrelated control of the said connected appliances.

My invention will be more readily understood by reference to the accompanying drawings, wherein—

Figure 1 is a longitudinal sectional view of my controlling device and connected appliances. Fig. 2 is another view thereof on line 2 2 of Fig. 1, and Fig. 3 is a plan view of the lever guide-plate of this controlling device.

Like parts are indicated by the same letters and numerals of reference in each of the figures of the drawings.

Within the casing $a$ is mounted the operating or controlling lever $b$ upon a cross-link or trunnion $c$, whereon said lever has lateral motion. The cross-link is keyed upon the shaft $d$, rotatably mounted in bearings $d'$. Lever $b$ extends through slotted openings $e'f'$, provided, respectively, in the oscillating controller part $e$ and the guide-plate $f$. The said controller part $e$ is pivotally mounted at $e^2$ within the frame or casing $a$, and the straight slot $e'$, adapted to receive the lever, is cut centrally throughout the length of said part. In the guide-plate a branched or forked slot is provided wherein the lever may be freely moved to secure the desired control of the connected apparatus. Three branches 1, 2, and 3 are required for effecting this control of the several appliances herein shown, the lever being capable of ready movement from its median position of rest shown in Fig. 1 at the point where said branches diverge. In this position the controlled apparatus is maintained quiescent.

Keyed upon shaft $d$ is the brake-arm $g$, connected with a band-brake or other braking device by means of rod $g'$, whereby the hoist may be quickly stopped when desired. A segmental gear $h$ is also mounted upon the said shaft, by which it is adapted to be brought into engagement with the pinion $j$, controlling the contact of the starting or resistance box $k$. Controller part $e$ is connected by link $l$ with the lever-arm $m$ of the reversing-switch $n$. The starting-box $k$ and reversing-switch $n$ are suitably connected in circuit with the motor actuating the hoist and the main dynamo, which, however, for the sake of clearness are omitted from the drawings.

The operation of my controlling device shown and above described is as follows: Assuming that the hoist is to be given an upward movement, the lever $b$ will be moved from its median position into the branch 3 of slot $f'$. This serves to rock part $e$ to the right and establish the necessary connection through the reversing-switch, while at the same time gear $h$ engages and partially rotates pinion $j$ and makes electrical connection with the motor through the starting-box. As the lever is moved farther within branch 3 more and more resistance is cut out of circuit and the motor is driven at an increasing rate of speed. This position of the lever and also that of the controller part *e* are indicated in Fig. 3 of the drawings. Should it be desired to stop the hoist suddenly, the lever is reversed, being drawn back within branch 1 of the slot, which shuts off the power and moves the arm *g*, and tension is placed upon the connecting-rod *g'*. This is communicated to the band-brake and the apparatus is stopped or slowed down, according to the force exerted upon the lever. To lower the hoist or reverse the motor's direction of rotation, the lever would be moved within the branch 2, which serves to tilt controller part *e* to the left and reverse the connections of switch *n*. The speed of the motor is controlled as before by moving the lever backward or forward within the branch 2. Thus it is apparent that the lateral movement of the lever controls the reversing-switch, while the longitudinal movement actuates either the starting-box or the braking mechanism, according to the direction of said movement from the median position of the lever. Accordingly the machinery connected therewith is placed under the closest control of the attendant, and because of the simplicity and positive action of the controlling device the management thereof is more prompt and efficient than when the usual apparatus is used.

Any well-known means may be employed for maintaining the controlling-lever in any of its positions of adjustment, and it is a matter of mechanical judgment or skill to so adjust the movements of the several controlling appliances to those of the lever that the best operation of the electrically-actuated machinery thus controlled may result—as, for example, in some instances it might be desirable to apply the brake before the power was entirely shut off at the starting-box, or in others to apply it a definite interval thereafter, either of which could be attained merely by the adjustment of the lever *g* and segmental gear *h*.

As the movement of the lever in the device shown is controlled by the form of slot in the guide-plate, it is apparent that any desired movement could be secured for the lever by altering the shape or proportions of the guiding-slot to suit the requirements made upon the device. The composite movement of the controlling-lever may, however, be secured in any desired manner, and its connections, either mechanical or electrical, may be altered to effect the results desired without departing from the spirit of my invention.

Having, however, described a controlling device embodying my invention, what I claim as new, and desire to secure by Letters Patent, is—

1. In a device of the class described adapted to control a plurality of appliances, the combination with a controlling-lever, of a mounting therefor adapted to permit its composite movement, a guide-plate adapted to direct the movement of said lever, a slotted controller part *e* adapted to be moved by the lateral actuation of said lever, and connecting parts uniting the lever and controller part with the controlled appliances, substantially as described.

2. The combination in a controlling device with a plate *f* provided with a branched guiding-slot, of a laterally-movable slotted controller part *e*, a controlling-lever extending through said slotted parts, a mounting therefor adapted to permit the composite movement of said lever, and connecting parts uniting the controlling-lever and part *e* with the controlled machinery, substantially as described.

3. The combination in a controlling device, with an operating-lever, of a universal joint or mounting permitting a free movement of said lever in any desired direction, a guiding way or slot adapted to direct the movement of said lever in the necessary direction, a slotted controller part *e* adapted to be actuated by the lateral movement of the operating-lever, a plurality of separate controlling appliances governing the controlled machinery, and means for transmitting to said several appliances the corresponding movement of said operating-lever and controller part *e*, substantially as described.

4. The combination in a controlling device for electrically-actuated appliances, with electrical and mechanical controlling apparatus as a switch or starting-box, and a brake device suitably connected with the controlled machinery and a source of electrical energy, of an actuating-lever *b*, a universal mounting therefor, a guide-plate *f* having a branched slot adapted to direct the several movements of said lever, slotted controller part *e* pivotally mounted and adapted to be moved by the lateral movement of the lever, and means for connecting said lever and controller part with the said mechanical and electrical controlling apparatus, whereby the separate movements of said lever are communicated to the respective pieces of apparatus and the connected machinery is in turn controlled, substantially as described.

In testimony whereof I affix my signature in the presence of two witnesses.

KARL ARNOLD BERNHARD DANIEL KÖTTGEN.

Witnesses:
HENRY HASPER,
CHARLES H. DAY.